United States Patent Office 3,244,649
Patented Apr. 5, 1966

3,244,649
MOLDING COMPOSITION CONTAINING CORK FILLER AND METHOD FOR PREPARING SAME
Milton R. Levitt, New Brunswick, N.J., assignor to The Scholl Mfg. Co., Inc., Chicago, Ill., a corporation of New York
No Drawing. Filed Dec. 14, 1961, Ser. No. 159,454
6 Claims. (Cl. 260—17.4)

This application is a continuation-in-part of my copending application Serial No. 831,923, filed July 7, 1959, and now abandoned.

The present invention relates to a composition for molding and also to a method of preparing such improved compositions.

The composition of the present invention is particularly applicable to the manufacture of inserts for orthopedic shoes. Heretofore, such inserts have commonly been made from a laminated structure which did not always possess the resilience desired, and was usually time consuming and expensive in manufacture.

One of the principal objects of the present invention is to provide improved heat curable molding compositions which can be used to receive the impression of parts of the anatomy and will retain such impression when heat cured.

Still another object of the invention is to provide an improved composition for molding having a resilient, light weight structure when fully cured.

A further object of the invention is to provide an improved method for making a heat curable molding composition.

The heat curable molding composition of the present invention includes particles of an emulsion polymerized polyvinyl chloride resin (or copolymers of the chloride in which the chloride predominates) dispersed in a liquid plasticizer in which the resin is insoluble at molding temperatures but which is capable of solvating the resin at elevated temperatures, in combination with a jelling agent and a sufficient amount of cork particles to substantially reduce the specific gravity of the composition and render it more resilient upon cooling from the solvating temperature.

As mentioned previously, the polyvinyl chloride resins can be used alone, or they can be used in the form of copolymers with other ethylenically unsaturated monomers such as vinyl acetate, vinyl propionate, methyl acrylate, butyl acrylate, methyl methacrylate, butyl methacrylate, acrylonitrile, vinylidene chloride and maleate esters such as dibutyl maleate. It is desired that the vinyl chloride resins be of reasonably high molecular weight, so as to be relatively insoluble in solvents such as toluene and butyl acetate, while still being soluble in cyclic and unsaturated ketones such as mesityl oxide, isophorone and cyclohexanone.

In order to obtain proper dispersion of the resin in the plasticizer, it is desirable to use finely divided resins. It is therefore desirable to employ a vinyl chloride resin which is made by the polymerization of the monomeric materials in aqueous emulsions such as by polymerization at temperatures of 35 to 40° C., as disclosed in U.S. Patent No. 2,068,424.

In making up the molding composition, the emulsion polymerized vinyl chloride resin is dispersed in a liquid plasticizer at a temperature at which the particles are soluble therein. The relative amounts of plasticizer and resin can be varied considerably, and usually extend from about fifty parts of plasticizer to one hundred parts of resin by weight to three hundred parts of plasticizer per hundred parts of resin by weight. It is generally preferable, however, to use an amount of plasticizer which is from one to two times the amount of resin involved.

A preferred plasticizer is di-2-ethyl hexyl phthalate. Others, however, can be used including tri(2-ethyl hexyl) phosphate, di(2-ethyl hexyl) adipate, and tricresyl phosphate.

The gelling agent used is usually an organophilic substance such as aminated bentonite. Still other suitable gelling agents include silica aerogels, aluminum laurate, aluminum di-2-ethylhexanoate, aluminum stearate, magnesium stearate and copper phthalocyanine. Generally, the amount of gelling agent will constitute about 2 to 10% by weight of the combination of resin, plasticizer and gelling agent.

In preparing the molding composition of the present invention, the particles of the polyvinyl chloride resin are mixed with the liquid plasticizer and the gelling agent. The combination of resin, plasticizer and gelling agent forms a thixotropic composition which can be readily converted to a resinous liquid by mixing. Finally, the cork particles are added to the previously prepared mixture which is liquefied by mixing, and the mixing is continued until a semi-solid moldable consistency is obtained.

The addition of the cork produces a molding material which is light weight, and is substantially more resilient than the molding mass would be without the cork. It is sometimes preferable to use a variety of sizes for the cork particles since while the larger size cork particles make a very light composition, they tend to cause splitting of the product. As a general rule, the average size of the cork particles will be in the range from about 8 to 14 mesh. In order to decrease the specific gravity even further, it is advisable to use burnt cork particles.

After the molding mass is made up, usually in the form of a sheet, it may be formed into a shoe inlay in the following manner. A sheet of aluminum foil or the like is placed over a shoe inlay, or the sole of the shoe, and the cork containing molding composition is placed over the aluminum foil and trimmed at the sides to the shape of the inlay or shoe sole. Next, the patient places his foot on the molding composition and brings the weight of his body onto it, thereby causing the resinous composition to flow and assume the impression of the bottom of the foot. After removal of the foot from the surface of the molding composition, it is trimmed at the sides and then heated at a temperature on the order of 300 to 400° F. A typical time-temperature relationship involves heating for fifteen minutes at 350° F. During this heating period, there is no chemical setting in the usual sense, but the plasticizer is effective to solvate the resin so that upon cooling from the elevated temperature, the material sets up without deformation of the impression, and becomes a resilient foot support suitable for insertion into the shoe.

The molding composition of the present invention may also include fillers, pigments, and the like as necessary or desirable for particular uses. The following specific examples illustrate typical molding compositions for making shoe soles, and illustrate more specifically the process involved.

EXAMPLES

The ingredients employed are given in the following table:

*Table I*

| | Parts by weight |
|---|---|
| Emulsion polymerized polyvinyl chloride ("Bakelite—QYNV") | 100 |
| Di-2-ethylhexyl phthalate | 150 |
| Vinyl resin solution | 50 |
| Talc | 50 |
| Silica aerogel | 28 |
| Titanium dioxide pigment | 10 |
| Short asbestos fibers | 25 |
| Ground cork | 38 |
| "Bakelite ERL–2774" resin (diglycidyl ether of bisphenol A) | 2 |

The vinyl resin solution referred to above was prepared by mixing in eight parts by weight of a copolymerized vinyl chloride-acetate resin ("Bakelite CYNS") in ninety-two parts of hot (165° F.) di-2-ethylhexyl phthalate. After the eight parts of resin had been dissolved in the ninety-two parts of plasticizer, the solution was allowed to cool. All of the additional ingredients, except for the ground cork, were charged to a pony mixer and mixed until a fluid dispersion was obtained. Then, the ground cork was added slowly, while mixing, until the material reached the desired consistency.

Generally, it is advisable to add as much cork as possible to the molding composition in order to decrease its weight and improve its flexibility. Amounts of cork on the order of 10 to 50% by weight of the resins present will be satisfactory.

Another example of a somewhat simplified composition for purposes of the present invention is given below:

For this formula, the following ingredients were used in the amounts given:

*Table II*

| | Parts by weight |
|---|---|
| Emulsion polymerized polyvinyl chloride | 100 |
| Di-2-ethylhexyl phthalate | 175 |
| Vinyl resin solution | 75 |
| Silica powder | 20 |
| Diglycidyl ether of bisphenol | 3 |
| Ground cork | 60 |

As in the preceding example, the vinyl resin solution was made up by using 92 parts of the plasticizer at a temperature of about 165° F., with eight parts of a vinyl chloride-vinyl acetate copolymer. About 75 parts of this previously prepared solution were then added to 100 parts of the emulsion polymerized polyvinyl chloride resin. This was followed by the addition of the 175 parts of the plasticizer, silica powder, and the diglycidyl ether of bisphenol. Finally, the ground cork was added with mixing until the cork was thoroughly dispersed within the mixture and the molding consistency obtained. The product was a highly viscous moldable material suitable for molding against the anatomy.

A particularly good molding composition had the following constitution:

*Table III*

| | Grams |
|---|---|
| "Bakelite QYNV" | 600 |
| Di-2-ethylhexyl phthalate | 1050 |
| "Bakelite VYNS" (copolymerized vinyl chloride-vinyl acetate) solution | 452 |
| Silica aerogel | 150 |
| Ground cork (8–14 mesh) | 450 |
| "Bakelite resin ERL–2774" | 18 |

The liquid plasticizer was stirred while heating to a temperature of approximately 180° F. Then the emulsion polymerized resin was sprinkled in, with continued stirring. After thorough mixing, the heat was removed and the mixture was permitted to cool. The additional ingredients, aside from the cork particles, were added and mixed until a fluid dispersion was obtained. Finally, the cork was added until a suitable molding consistency was obtained.

While the foregoing discussion has been primarily concerned with the manufacture of insoles and the like, it should be recognized that the composition of the present invention has utility to other types of molding, including the manufacture of casts, arch supports, orthodigital devices, orthopedic pads, and the like.

I claim as my invention:

1. A heat curable molding composition comprising particles of an emulsion polymerized polyvinyl chloride resin dispersed in a liquid plasticizer in which said resin is insoluble at molding temperatures but which is capable of solvating said resin at elevated temperatures, said plasticizer being selected from the group consisting of di-2-ethyl hexyl phthalate, tri(2-ethyl hexyl) phosphate, di(2-ethyl hexyl) adipate and tricresyl phosphate, a gelling agent selected from the group consisting of aminated bentonite, silica aerogel, aluminum laurate, aluminum di-2-ethyl hexanoate, aluminum stearate, magnesium stearate, and copper phthalocyanine, and a sufficient amount of cork particles to substantially reduce the specific gravity of the composition and render it more resilient upon cooling from the temperature at which the resin particles are solvated by said plasticizer.

2. A heat curable molding composition comprising particles of an emulsion polymerized polyvinyl chloride resin dispersed in a liquid plasticizer in which said resin is insoluble at molding temperatures but which is capable of solvating said resin at elevated temperatures, said plasticizer being selected from the group consisting of di-2-ethyl hexyl phthalate, tri(2-ethyl hexyl) phosphate, di(2-ethyl hexyl) adipate, and tricresyl phosphate, a gelling agent selected from the group consisting of aminated bentonite, silica aerogel, aluminum laurate, aluminum di-2-ethyl hexanoate, aluminum stearate, magnesium stearate, and copper phthalocyanine, and cork particles in an amount of at least 10% by weight of the resin present.

3. A heat curable molding composition comprising particles of an emulsion polymerized polyvinyl chloride resin dispersed in a liquid plasticizer in which said resin is insoluble at molding temperatures but which is capable of solvating said resin at elevated temperatures, said plasticizer being selected from the group consisting of di-2-ethyl hexyl phthalate, tri(2-ethyl hexyl) phosphate, di(2-ethyl hexyl) adipate, and tricresyl phosphate, a gelling agent selected from the group consisting of aminated bentonite, silica aerogel, aluminum laurate, aluminum di-2-ethyl hexanoate, aluminum stearate, magnesium stearate, and copper phthalocyanine, and cork particles in an amount of from 10 to 50% by weight of the resin present.

4. A heat curable molding composition comprising particles of an emulsion polymerized polyvinyl chloride resin dispersed in a liquid plasticizer in which said resin is insoluble at molding temperatures but which is capable of solvating said resin at elevated temperatures, said plasticizer being selected from the group consisting of di-2-ethyl hexyl phthalate, tri(2-ethyl hexyl) phosphate, di(2-ethyl hexyl) adipate, and tricresyl phosphate, a gelling agent selected from the group consisting of aminated bentonite, silica aerogel, aluminum laurate, aluminum di-2-ethyl hexanoate, aluminum stearate, magnesium stearate, and copper phthalocyanine, and a sufficient amount of cork particles to substantially reduce the specific gravity of the composition and render it more resilient upon cooling from the temperature at which the resin particles are solvated by said plasticizer, said cork particles constituting a mixture of relatively coarse and relatively fine particles.

5. A heat curable molding composition comprising particles of an emulsion polymerized polyvinyl chloride resin dispersed in a liquid plasticizer in which said resin is insoluble at molding temperatures but which is capable of solvating said resin at elevated temperatures, said plasticizer being selected from the group consisting of di-2-ethyl hexyl phthalate, tri(2-ethyl hexyl) phosphate, di(2-ethyl hexyl) adipate, and tricresyl phosphate, a gelling agent selected from the group consisting of aminated bentonite, silica aerogel, aluminum laurate, aluminum di-2-ethyl hexanoate, aluminum stearate, magnesium stearate, and copper phthalocyanine, and burnt cork particles in an amount of at least 10% by weight of the resin present.

6. The method of making a molding composition which comprises mixing an emulsion polymerized polyvinyl chloride resin with a liquid plasticizer in which said resin is insoluble at molding temperatures but which is capable of solvating said resin at elevated temperatures, said plasticizer being selected from the group consisting of di-2-ethyl hexyl phthalate, tri(2-ethyl hexyl) phosphate, di(2-ethyl hexyl) adipate, and tricresyl phosphate, adding a gelling agent to the resulting mixture, said gelling agent being selected from the group consisting of aminated bentonite, silica aerogel, aluminum laurate, aluminum di-2-ethyl hexanoate, aluminum stearate, magnesium stearate, and copper phthalocyanine, agitating the mixture thus produced until a uniform dispersion is obtained, and then adding cork particles with additional mixing until a semi-solid moldable consistency is obtained.

References Cited by the Examiner

UNITED STATES PATENTS

| | | | |
|---|---|---|---|
| 2,558,378 | 6/1951 | Petry | 260—17.4 |
| 2,560,420 | 7/1951 | Dodge | 260—17.4 |
| 2,980,643 | 4/1961 | Edelman et al. | 260—31.8 |

FOREIGN PATENTS

| | | |
|---|---|---|
| 712,820 | 8/1954 | Great Britain. |
| 748,046 | 4/1956 | Great Britain. |

JOSEPH L. SCHOFER, *Primary Examiner.*

LEON J. BERCOVITZ, *Examiner.*